Aug. 15, 1961 C. M. BYERLY 2,996,679
WAVEFORM GENERATOR HAVING INDEPENDENT CONTROL OF INITIAL SLOPE AND FINAL AMPLITUDE
Filed Feb. 21, 1957
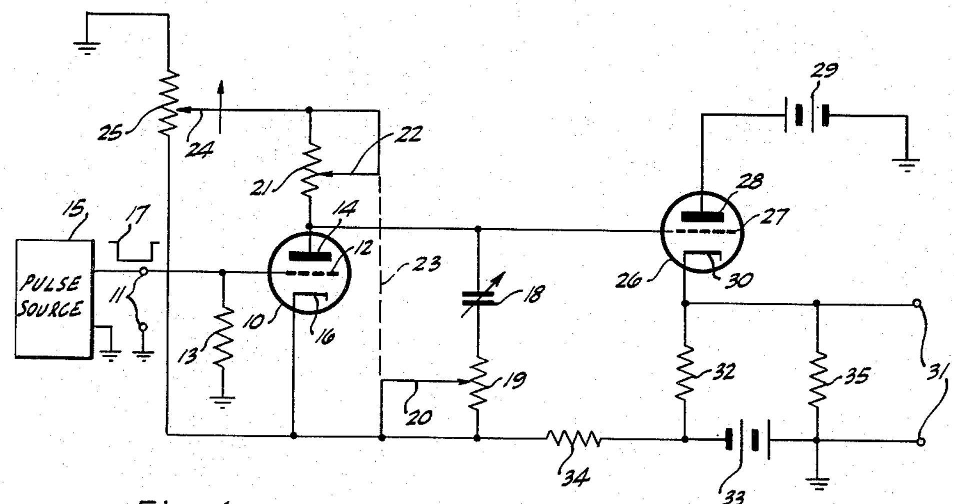
Fig. 1.
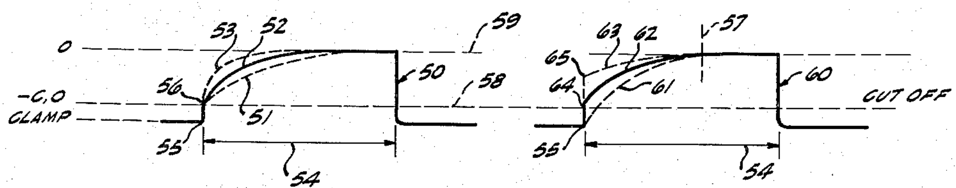
Fig. 2.
Fig. 3.
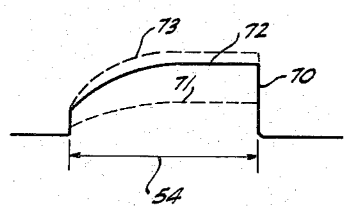
Fig. 4.
INVENTOR.
COY M. BYERLY,
BY
AGENT.

United States Patent Office 2,996,679

Patented Aug. 15, 1961

2,996,679

WAVEFORM GENERATOR HAVING INDEPENDENT CONTROL OF INITIAL SLOPE AND FINAL AMPLITUDE

Coy M. Byerly, Los Angeles, Calif., assignor to Hughes Aircraft Company, Culver City, Calif., a corporation of Delaware Filed Feb. 21, 1957, Ser. No. 641,731
1 Claim. (Cl. 328—178)

This invention relates to wave generators and more particularly to a circuit for producing a waveform, the characteristics of which can be controlled independently and without interaction.

In radar systems, the echo signals received from targets at close range are generally of much larger amplitude than echo signals received from targets at longer ranges during the same scan. Hence, it is common practice to provide pulse waveforms of a duration which corresponds to the range of the system and of a progressively increasing amplitude thereby to provide bias of a type which would tend to make the resultant amplitude of echo signals independent of range.

These pulse waveforms have three characteristics which are useful and which may require control in the application of pulses to circuits of this type. These characteristics are the initial amplitude on the leading edge of the pulse at which point the waveform begins to take shape, the slope of the pulse from this starting point to the maximum amplitude and the final or maximum amplitude of the pulse or wave. It is desirable to control each of these characteristics independently of the others to facilitate the optimum adjustment of the radar system.

In a wave generating circuit where each of the above-named characteristics of the waveform is independently controllable, the range of utility of such waveforms is greatly increased when only the selected characteristic may be changed without affecting any other.

For example in a radar receiver for pulsed microwave energy such pulses may be used as gate pulses to turn the receiver on only for predetermined intervals during which echo pulses are expected to arrive thereby to automatically control gain of intermediate frequency amplifiers in such receivers for predetermined periods. That is, the progressively increasing amplitude of the pulses provides sensitivity-time control for the receivers. Sensitivity-time control of microwave receivers may be described as a control of the gain, that is, of the sensitivity of the receiver over a predetermined time interval where the gain at the beginning of the time period may be held to a low level and may build up to a higher level at the end of the time period.

Thus, as applied in pulsed radar systems a sensitivity-time control reduces the receiver sensitivity for a period of time following the transmission of a pulse burst of energy so that echo signals from relatively close reflecting objects will not overload the receiver. The sensitivity is increased at a predetermined rate over the pulse echo interval which corresponds approximately to the pulse repetition interval. Thus the sensitivity of the receiver is greatest for the echo signals which come from the greatest distance and hence require the longest return time.

Accordingly it is an object of this invention to provide a waveform generator which provides waveforms wherein the initial or starting amplitude, slope and final or maximum amplitude are independently adjustable.

It is a further object of this invention to provide a waveform generator responsive to external trigger pulses for generating a pulse of predetermined duration, the characteristics of the generated pulse being selectively adjustable.

It is an other object of this invention to provide a waveform generator wherein the waveforms generated thereby are separately adjustable as to slope, starting amplitude and final amplitude, and wherein the adjustment of a selected characteristic will in no way change any characteristic waveform previously obtained by means of any of the other adjustments.

These and other objects of this invention will become more evident from the specification and claim which follow taken together with the drawing in which:

FIG. 1 is a circuit diagram of a waveform generator according to this invention;

FIG. 2 is a waveform adjustable in slope by the circuit of FIG. 1;

FIG. 3 is a waveform adjustable in starting amplitude; and

FIG. 4 is a waveform adjustable in final amplitude.

As has been discussed above there are three characteristics of a wave which may be utilized in pulse circuits: the starting amplitude, slope and maximum amplitude. It is the function of the circuit of FIG. 1 to provide means for individually adjusting each of these characteristics without affecting any one of the other characteristics.

Referring to the circuit diagram of FIG. 1, a switch tube 10, which may be a triode as shown has a control grid 12, an anode 14 and a cathode 16. A grid leak resistor 13 is connected between control grid 12 and ground. A pair of input terminals 11 are connected to control grid 12 and ground. Block 15 represents a source of pulses such as may be found in a radar system and is connected to input terminal 11. A negative-going pulse 17 represents the type of pulse applied to grid 12 from pulse source 15. A variable capacitor 18 is connected in series with a rheostat 19. The series connected elements 18, 19 are connected between anode 14 and cathode 16 of switch tube 10. The variable arm 20 of rheostat 19 is also connected to cathode 16 of switch tube 10. A rheostat 21 is connected to the anode 14 of switch tube 10. Rheostat 21 has a variable arm 22 which is mechanically coupled as shown at 23 to the variable arm 20 of rheostat 19. One end of rheostat 21 and the variable arm 22 of rheostat 21 are connected to the variable arm 24 of a potentiometer 25. Potentiometer 25 has one end connected to ground and the other end to cathode 16 of switch tube 10.

A cathode follower including a triode 26 is connected by its control grid 27 to anode 14 of switch tube 10. The anode 28 of cathode follower 26 is connected to the positive terminal of a potential source 29. The negative terminal of potential source 29 is connected to ground. The cathode 30 of cathode follower 26 is connected to one of a pair of output terminals 31, the other output terminal being referenced to ground. A cathode bias resistor 32 is connected from cathode 30 of cathode follower 26 to the negative terminal of a potential source 33 the positive terminal of which is referenced to ground. A resistor 34 is connected between the negative terminal of potential source 33 and the cathode 16 of switch tube 10. An output load resistor 35 is connected from the cathode 30 of cathode follower 26 to ground.

The waveforms shown in FIGS. 2, 3 and 4 respectively, to which reference is now made, represent pulse waveforms which may be generated by the circuit of FIG. 1. The operation of the circuit of FIG. 1 will be described hereinafter.

The pulse 50 of FIG. 2 may have a waveform slope of any desired rate as shown by curves 51, 52 and 53 by adjusting the capacitance of variable capacitor 18. The solid line curve 52 may be considered a normal slope. The dashed lines 51 and 53 respectively represent an exemplary range of variation in slope over which such a pulse wave may be adjusted.

A pulse such as 50 with a variable slope may be adjusted to create a gain variation in a radar receiver over the time duration of the pulse as indicated by the arrow 54. The pulse starting time 55 in the use of this invention in a pulse-echo radar system would correspond to the time of the transmission of a pulse of wave energy by the radar transmitter or a pulse delay to occur immediately after the transmitted pulse so that the transmitted pulse itself will not affect the receiver. The interval 54 is the time between successive transmitted pulses. During interval 54 the radar receiver is listening for echoes of the transmitted pulse. If the pulse 50 is applied to an appropriate chain of grid biased circuits in an intermediate-frequency amplifier of such a receiver, the gain may be controlled over the interval 54 to correspond to any one of the slopes 51, 52, or 53 as selected. Note that all curves start from the same initial amplitude 56 in the leading edge of pulse 50.

It may be desirable to start the slope of the pulse at different amplitudes on the leading edge of the pulse. This is accomplished by simultaneously increasing or decreasing the resistance of rheostat 21 decreasing or increasing respectively, the resistance of rheostat 20 by means of mechanical linkage 23 thereby to maintain the time constant of the resistive-capacitance circuit at the output of tube 10 a constant. As illustrated in FIG. 3 for a pulse 60, the application of the negative going pulse 17 to the control grid 12 of tube 10 cuts off the flow of current therethrough, whereupon the anode 14 of tube 10 immediately assumes a potential determined by the voltage division between rheostats 19, 21. The slope 61 of pulse 60 begins at the zero amplitude point 55. The slopes 62 and 63 each begin at higher amplitudes 64 and 65 on the leading edge than that of slope 61. Note that the point 57 at which the slope reaches its maximum is the same regardless of the amplitude of the leading edge at which the slope starts.

As one example of a use for the adjustable waveform 60 it may be desired to have the gain variation previously described start at a higher or lower initial level. For example at 55, the quiescent level of the pulse is shown. The amplifier is normally maintained at this level 55 which corresponds to a value more negative than the cut-off bias of the amplifier to which the pulse is to be applied. The dashed line 58 represents a negative value of bias at which cut-off of the amplifier plate current occurs. The zero level of bias is shown at 59 as one maximum amplitude level which the pulses such as 50 and 60 may achieve.

In FIG. 4 there is shown a representation of a waveform 70 which is variable in amplitude as shown at 71, 72, and 73.

Since this is the type of characteristic which by itself is familiar representing waveform amplitude variations accomplished through operation of known types of volume controls or gain control devices, no special description of its characteristics is presented here.

Because in the use of the circuit of this invention as described below it is possible to adjust any one of the characteristics illustrated in the pulse waveforms of FIGS. 2, 3 and 4, respectively, without affecting the other adjustments it will be clear that the waveforms of FIGS. 2 and 3 may be varied in amplitude as shown in FIG. 4. Similarly, the waveforms of FIGS. 3 and 4 may be varied in slope as in FIG. 2. The waveforms of FIGS. 2 and 4 may be varied in starting amplitude as shown in FIG. 3.

Referring now to both the circuit of FIG. 1 and the waveforms of FIGS. 2 thru 4 the operation of the wave generator of this invention may be described as follows:

Switch tube 10 is normally conducting by virtue of the connection of grid leak resistor 13 between grid 12 and ground, while the cathode 16 is maintained at a negative potential by battery 33, so that any charge appearing on capacitor 18 will be discharged through tube 10. When a negative-going pulse 17 is applied to the grid 12 of amplifier 10 from source 15, for the duration of the pulse 17 tube 10 is rendered nonconducting. During the time tube 10 is nonconducting capacitor 18 is charged from potential source 33 and resistor 34 through arm 20 and resistor 19 and through arm 22 and resistor 21. Resistors 19 and 21 on a common shaft are operated simultaneously so that as the resistance of either one is increased, the resistance of the other is decreased by virtue of the simultaneous movement of their arms 20 and 22. In this way there is always the same resistance in the R-C charging circuit represented by resistors 21 and 19 and capacitor 18. The slope, that is, the rate of increase of the charge developed across capacitor 18 is determined by the value of its capacitance as adjusted by its variable plate. The variable resistors 19 and 21 mechanically operated together establish the starting amplitude of the charging slope. The overall amplitude is adjusted by the setting of arm 24 of potentiometer 25, because the maximum charge to which capacitor 18 may be raised is equal to the potential derived from the point to which arm 24 is set on the voltage divider formed by resistors 25 and 34 across potential source 33.

Thus it may be seen that the slope characteristics 51, 52, 53 shown in FIG. 2 for the waveform 50 are derived by the setting of capacitor 18 because the rate of change will be due to the value of the capacitance. It is to be noted that for any setting of resistors 21 and 25 all slopes determined by capacitor 18 begin at the same starting amplitude, point 56, in the leading edge of the pulse.

Further, the amplitude on the leading edge of the pulse 60 at which the slope begins as shown in FIG. 3, may be set by the simultaneous operation of the starting amplitude controls (resistors 19 and 21). The slopes shown as 61, 62 and 63 beginning at points 55, 64 and 65 respectively illustrate this. Any of the three slope conditions shown in FIG. 2 at 51, 52 and 53 as selected by operation of capacitor 18 may begin at the points 55, 64 or 65, on the leading edge of the pulse as selected by the operation of the start control (19 and 21). It is to be noted that the three curves 61, 62 and 63 have the same duration from starting 55 until maximum amplitude is reached at 57. In other words it may be considered 61, 62, 63 are obtained by rotating them on a pivot point corresponding to point 57.

By the operation of control 25 the maximum amplitude, to which the pulse waveforms generated by the circuit of FIG. 1 may be adjusted, is set. The waveform 70 in FIG. 4 is illustrative of the variation in amplitude of pulses 71, 72 and 73. Pulses having any one of the six shapes represented at 51, 52, 53, in FIG. 2, 61, 62, 63 in FIG. 3 may each be varied in amplitude by the operation of control 25. It may be seen that the action of control 25 when arm 24 is adjusted is to increase or decrease the potential that is applied to the capacitor 18 from potential source 33, and also to the anode of switch tube 10.

For the duration of the negative going pulse 17 capacitor 18 may be charged. At the termination of pulse 17 switch tube 10 is rendered conducting again and capacitor 18 discharges. The pulses as shown FIGS. 2, 3 and 4 are repeated once for every occurrence of the pulses 17.

The signal corresponding to the waveform of the charge and discharge of capacitor 18 is applied to the control grid 27 of cathode follower 26 and appears at the cathode 30 as an output pulse across cathode bias resistor 32, and also across output load resistor 35. The output terminals 31 are across resistor 35. It is to be noted that with respect to ground the cathode is normally negative so that when this invention used in connection with receivers or other devices a normally negative bias is provided to the utilization circuit. This bias may actually be the value required for anode current cut-off of the utilization circuit should this be the desired operating condition.

The pulses as shown in FIGS. 2, 3, and 4 may be applied to the intermediate-frequency amplifiers of radar systems as previously described to provide the control of sensitivity in a program determined by the shape of the pulse. To apply the pulse waveforms generated by the circuits of this invention the output terminals 31 are connected to the utilization circuit which as previously discussed may be an intermediate-frequency amplifier in a radar receiver.

There has been described above a wave generating circuit whose operation is initiated by a negative going pulse from a source of pulses such as found in a radar system and which generates waves for the duration of the pulses from the source. The generated waves may be adjusted independently with respect to amplitude of start on the leading edge of the pulse, the slope from a predetermined starting amplitude to the maximum amplitude and the overall amplitude.

The adjustment of the amplitude of any one of the characteristics of the pulse waveform, its starting amplitude, slope and final amplitude is made independently of, and without effect upon, any prior adjustment which is made in any of the other characteristics.

What is claimed as new is:

In a radar system, a sensitivity-time bias voltage generator comprising an electron discharge device including a control grid, a cathode and an anode; a first variable resistor having first and second extremities, said first extremity being connected to said anode of said electron discharge device; means for applying a direct current potential from said second extremity of said first variable resistor to said cathode thereby to produce a flow of current through said electron discharge device and said first variable resistor; a capacitor of predetermined capacitance and a second variable resistor connected in series combination from said anode to said cathode of said electron discharge device; a mechanical linkage coupled from said first variable resistor to said second variable resistor thereby to maintain the total resistance in the series combination of said first and second variable resistors constant; and means coupled to said control grid for periodically rendering said electron discharge device non-conductive for predetermined intervals of time thereby to produce a series of waveforms having characteristics during said predetermined intervals of time determined by the time constant of said predetermined capacitance and said total resistance of said first and second variable resistors and having a slope commencing at a potential level determined by the distribution of resistance between said first and second variable resistors.

References Cited in the file of this patent

UNITED STATES PATENTS

| | | |
|---|---|---|
| 2,455,283 | Valley | Nov. 30, 1948 |
| 2,480,511 | Schade | Aug. 30, 1949 |
| 2,578,268 | Sherwin | Dec. 11, 1951 |
| 2,814,760 | Beveridge et al. | Nov. 26, 1957 |